Aug. 27, 1968 G. PERKINS, JR., ET AL 3,398,512
CHROMATOGRAPHY APPARATUS
Filed April 18, 1966 2 Sheets-Sheet 1
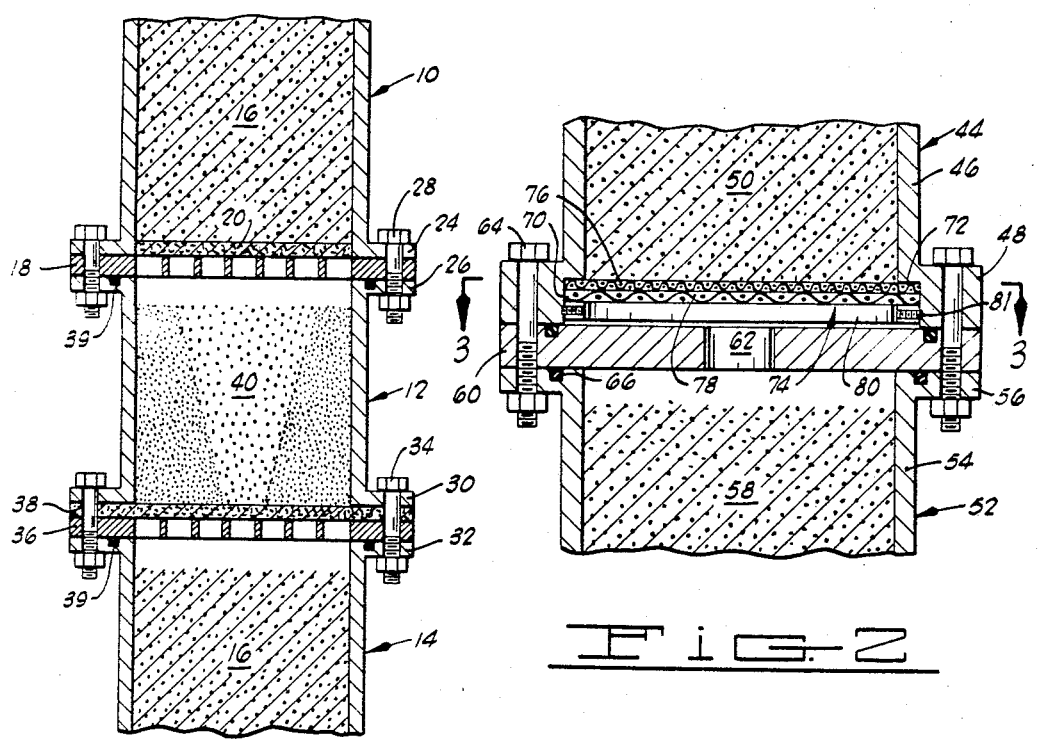
Fig. 1
Fig. 2
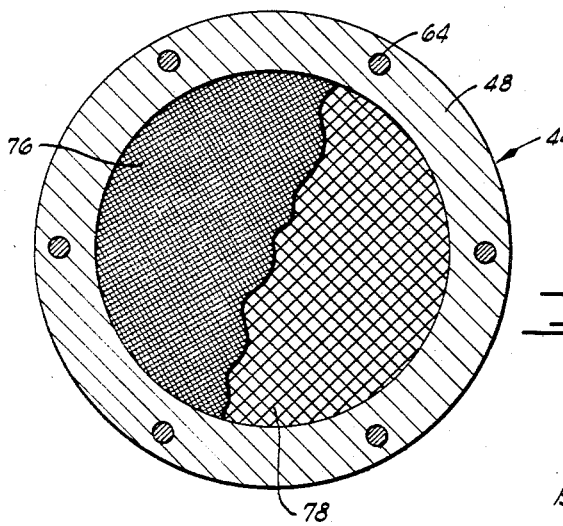
Fig. 3
INVENTORS
GERALD PERKINS JR. &
ALFRED B. CAREL
BY David P. Cullen
ATTORNEY

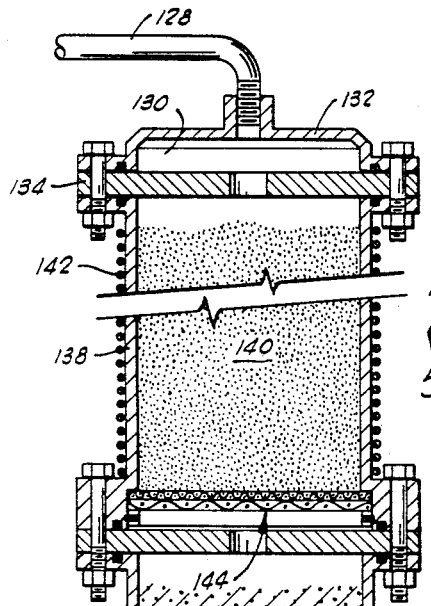
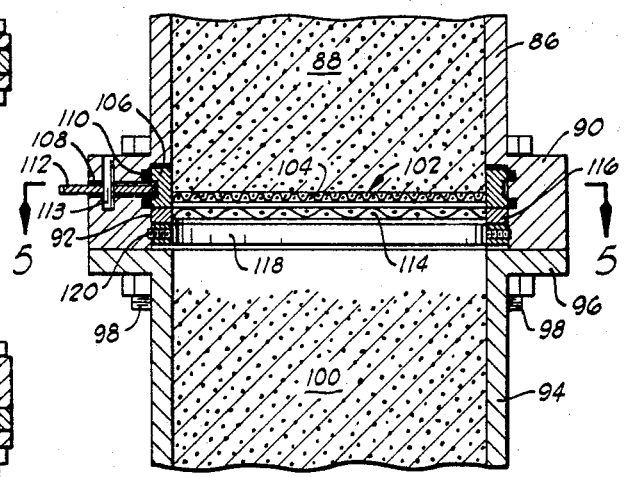
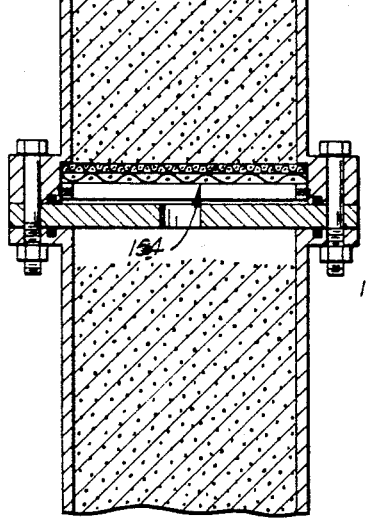
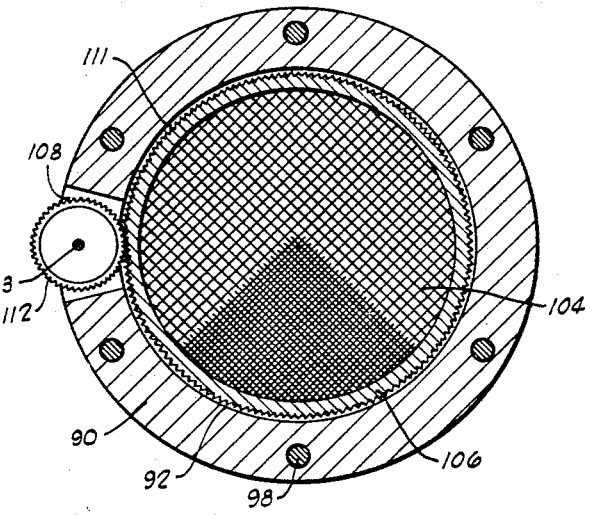
INVENTORS.
GERALD PERKINS JR &
ALFRED B. CAREL
BY
ATTORNEY

United States Patent Office 3,398,512
Patented Aug. 27, 1968

3,398,512
CHROMATOGRAPHY APPARATUS
Gerald Perkins, Jr., and Alfred B. Carel, Ponca City, Okla., assignors to Continental Oil Company, Ponca City, Okla., a corporation of Delaware
Filed Apr. 18, 1966, Ser. No. 543,151
4 Claims. (Cl. 55—386)

ABSTRACT OF THE DISCLOSURE

Gradients in a chromatography column are corrected by means comprising packing of varying density or thermal conductivity, or packing support screens of variable porosity.

---

This invention relates to chromatographic columns. More particularly, but not by way of limitation, the invention relates to an improved gas chromatographic column which includes a tubular section packed with a particulate material of high thermal conductivity incorporated in the column at a selected location, and, in some embodiments of the invention, includes means for reducing component concentration profile distortion in the column.

In gas chromatography, it is conventional practice to move a mixture of gaseous or vaporized materials through a packed column by the use of a carrier gas. The column packing in most instances will consist of solid particulate material which may or may not carry liquid film on the surface thereof. This packing is characterized in having a different adsorptive affinity for each of various components of the mixture charged to the column, and thus exerts a separatory effect which resolves the mixture into a plurality of components which are removed from the column at different times. Though the described basic procedure of gas chromatography has been refined and improved in many aspects over recent years, several conditions inherent in the procedure, and in the construction of such columns continue to give rise to problems which have not yet been solved in an optimum manner.

One of the most serious of these problems, particularly in columns of relatively large diameter, such as those used in preparative chromatography, is the tendency of the separated component bands to become geometrically distorted as they move through the column. Such distortion of the profiles of component bands is caused by any one of several conditions which are generally present in the column. These conditions include channeling, wall effect, thermal gradients, impacted zones and the like, and are generally familiar to those skilled in the art of chromatography. Distortion of the component profiles is very undesirable since it prevents clean separation of the components and/or asymmetrical elution and detection of the components, and thus reduces the accuracy of analyses obtained by the method, and prevents large scale preparation of high purity chemicals by the chromatographic process.

Another problem which confronts the gas chromatographer with some types of sample mixtures is that of bringing the mixture to a desired temperature preparatory to its introduction to the column, and retaining it at this temperature, or of bringing it rapidly to a different temperature, at the instant that it initially contacts the column packing. With many types of sampling systems currently being used conjunctively with chromatographic columns, little or no difficulty is experienced in the introduction of some types of samples at particular predetermined temperatures, but the sampling versatility of the system is limited. Frequently, too, the distance between the column inlet and the location at which the sample is vaporized and merged with the carrier gas is relatively great, and the temperature control over the intervening flow path is poor, so that part of the sample may be lost by condensation before it enters the column, or the sample and carrier gas may be introduced to the column at a temperature which is far from optimum.

The present invention provides an improved chromatography apparatus which includes the usual types of chromatographic columns in which have been incorporated, by the teaching of the present invention, a heat exchange structure, which, according to its positioning in the column, can be used either to improve the effectiveness with which various types of samples may be introduced to the column, or to prevent component profile distortion as the separated components move through the column, or for both of these purposes. The invention also contemplates the inclusion in the column of another type of structure for preventing or reducing component profile distortion, and this structure may be either used conjunctively with, or separately from, the heat exchange structure constituting one aspect of the invention.

Broadly described, the chromatography apparatus of the invention comprises, in one embodiment, a column of the type having a gas inlet, a gas outlet, at least one column wall interconnecting the gas inlet and gas outlet and confining solid particulate packing material, and means for preventing or reducing component profile distortion by straightening or reshaping component profiles after they have sustained distortion. The means for reducing component profile distortion may constitute either a column section packed in a predetermined manner with a solid particulate material having relatively good thermal conductivity, or it may constitute a pair of superimposed screens which are adjustable in their positions relative to each other, and are provided with openings or pores therethrough which preferably permit a variable permeability gradient to be established across the column by a predetermined adjustment of the positions of the screens relative to each other.

In a different embodiment of the invention, a column section which encloses the solid particulate material of high thermal conductivity is positioned at the head of the column and upstream from column sections containing regular packing material. In this arrangement, the thermal conductivity characteristic of the solid particulate material in the column adjacent the fluid inlet thereto is employed to provide a desired thermal environment for the introduction of gaseous mixtures to the column.

From the foregoing description of the invention, it will have become apparent that it is a major object of the present invention to provide improved chromatography apparatus which can be utilized to provide more effective and versatile sample introduction to a chromatographic column, and which can also be utilized to eliminate or reduce component profile distortion in such columns.

An additional object of the invention is to provide a structure which can be dually employed for the purpose of supporting the particulate packing in a chromatographic column, and simultaneously reducing component profile distortion occurring within the column.

Another object of the invention is to provide a packing supporting structure of variable porosity and low cost of construction.

A further object of the invention is to provide an inert, thermally conductive packing material at the inlet of a chromatographic column, which packing material prevents excessive degradation of the separatory packing material downstream therefrom in the column.

An additional object of the invention is to provide a profile reshaping structure for use in a chromatographic column, which structure can be varied in its permeability to establish both longitudinal and transverse permeability gradients in the chromatographic column.

In addition to the foregoing objects and advantages, additional objects and advantages will become apparent as the following detailed description of the invention is read in conjunction with the accompanying drawings which illustrate the invention.

In the drawings:

FIGURE 1 is a vertical sectional view through a portion of a chromatographic column and depicting one aspect of the present invention constituting a section of the column filled with a solid particulate material of high thermal conductivity.

FIGURE 2 is a vertical sectional view through a portion of a chromatographic column illustrating another aspect of the present invention, such aspect constituting a variable porosity packing support structure.

FIGURE 3 is a sectional view taken along line 3—3 of FIGURE 2.

FIGURE 4 is a vertical sectional view through a portion of a chromatographic column illustrating a different embodiment of the invention.

FIGURE 5 is a sectional view taken along line 5—5 of FIGURE 4.

FIGURE 6 is a vertical sectional view through a portion of a chromatographic column illustrating a further embodiment of the present invention incorporating both of the subcombinations depicted in FIGURES 1 and 2.

Before referring to the drawings, a brief discussion of several aspects of gas chromatography which give rise to the problems solved by the present invention will aid in understanding the invention. In chromatographic columns, particularly those of large cross-sectional area, the column is frequently operated at other than ambient temperatures so that heating or cooling takes places through the column walls. A result of this type of operation is that a radial thermal gradient is almost always established across the column. The radial thermal gradient thus produced undesirably affects the flow of fluids through the column and is generally recognized as being one cause of component profile distortion in the column.

In explanation of this latter phenomena, one may consider the movement of the several components of a sample mixture introduced to the column along the axis of the column from the inlet end thereof to the discharge end of the column. Due to the separatory action of the column packing, the components of the mixture are resolved or separated, and move through the column as distinct bands or zones in which the separated component is present in a high concentration in the carrier gas used to sweep the mixture through the column. It is recognized that the most efficient and desirable separation of components occurs when these bands are geometrically symmetrical, and are cleanly separated from each other by the time that they reach the discharge end of the column and are eluted therefrom.

Departures from the desired symmetry of the component concentration profiles is caused to occur by a number of conditions inherent in the column operation, including the radial thermal gradients hereinbefore described. Thus, where the packing material at the center of the column is cooler than the packing material adjacent the column wall, the radially outer portions of the gases in the component concentration band are caused to move more rapidly through the column than the gases toward the center of the column with the result that the component concentration profile develops a concavity at its leading edge and a convex configuration at its trailing edge. This distortion in turn results in overlap or dovetailing of the component bands moving through the column, and makes detection and accurate analysis of the components successively eluted from the column difficult. Distortion of the type described may also result in tailing and other asymmetrical characteristics in the eluted components moving through a detection system, with the result that accurate quantitative evaluation of the component is difficult or impossible. Such profile distortion also makes it difficult to successfully and efficiently operate large diameter chromatographic columns for the purpose of preparing pure chemicals in large volumes.

In FIGURE 1 of the drawings, a chromatographic column is illustrated and includes an upper tubular section 10, a central tubular section 12 and a lower tubular section 14. A particulate packing material 16 is utilized in the upper and lower sections 10 and 14, respectively, and can be any conventional packing material of the type generally used in gas liquid partition chromatography columns. Such packing is usually a solid particulate material which, in many instances, will be coated with a non-reactive stationary liquid phase which exhibits a selective affinity for various components in the mixture to be separated by the column.

For the purpose of supporting the packing particles in the upper section 10, a perforated steel plate 18 is provided across the lower end of the section 10 and is floored with a sufficient thickness of Fiberglas batting 20 to prevent passage of the packing particles through the perforations in the plate 18. The plate 18 is connected between flanges 24 and 26 carried by the column sections 10 and 12, respectively, using bolts 28 or the like for interconnecting the column sections and the plate. The central section 12 is also connected to the lower section 14 by the use of flanges 30 and 32, and bolts 34, with a perforated plate 36 and suitable batting 38 being positioned between these column sections. O-rings 39 are provided for assuring a gas-tight connection between the column sections and perforated plates.

The central column section 12 is filled with solid particulate material 40 having a high thermal conductivity, such as metal powder, shot or turnings. The thermal conductivity preferably exceeds 0.05 calorie/second through a plate of the pure material of which the particulate material 40 is made, such plate being 1 cm. in thickness and 1 cm.$^2$ in area, the temperature differential being 1° C. Preferred metals are iron, aluminum, steel, lead and copper. In the FIGURE 1 embodiment of the invention, the thermally conductive particulate material 40 is arranged to provide a permeability gradient in the solid particles. The gradient is achieved by using smaller particles, and packing such particles more densely, in the outer portions of the column section than in the center thereof. As illustrated, toward the top of the column section 12, relatively coarse, loosely packed particles extend the greater portion of the transverse width of the column. Nearer the lower end of the section 12, fine, densely packed particles extend a substantial distance inwardly from the column wall, and coarse, relatively loosely packed particles exist only in the region of the central axis of the column section. The overall effect then is to provide a funnel-shaped permeability gradient in the column section 12.

The achievement of a variable density in the thermally conducting particulate material 40 in the column section 12 can be accomplished in several ways. For example, a simple radial density gradient can be produced by placing concentric, annular rings at intervals within the column section, filling the space between the rings with metal powders or turnings of varying particle size, that is, one particular size in one particular space, and finally, removing the space-defining concentric annular rings so that the bed of solid particles flows together and becomes essentially homogeneous except for the heterogeneity of particle size. Another method which can be employed is to rotate the column section while pouring powders of varying particle size into the top or open end of the column section with the pouring vessels being arranged along the diameter of the cross-section of the column so that powders of different particle sizes accumulate in a series of concentric, annular rings within the section. The achievement of a longitudinal density gradient can be produced by either of the methods just described, except that the particles are varied in size as the particles fill the column section 12. For a simple longitudinal density gradient, the column section 12 is simply filled in stages with the bottom layer being of one particle size, the next uppermost layer of different particle size, and so on, until the top of the column section is reached. By combining these section filling operations in a predetermined manner, any desired type of permeability profile can be achieved in the column section so that, as hereinafter explained, gaseous flow through the section can be directed in any chosen path or direction by a proper preselection of the permeability gradient which is to characterize the packed section.

It should be noted that, though one method which may be used to interconnect the column sections 10, 12 and 14 and for supporting the packing material therein has been disclosed in FIGURE 1 of the drawings and described above, other types of connecting and supporting structures can be utilized and, except insofar as they may be employed in combination with the section 12 of the column as hereinafter described, constitute no part of the present invention.

The embodiment of the invention illustrated in FIGURE 1 permits undesirable component concentration profile distortion to be effectively counteracted. This counteraction results from the presence of the column section 12 with its packing of solid particulate material 40 having a high thermal conductivity characteristic. Thus, for example, assuming that a sample mixture has been introduced to the top of the column and is moving downwardly in the column through the upper section 16, the separatory action of the packing material 16 will resolve the mixture into a plurality of components which appear as bands or zones of concentrated component in carrier gas. If it be further assumed that the chromatographic column is being operated, as is frequently the case, at an elevated temperature by surrounding the column with a heat exchange device or heated media, it will be seen that a thermal gradient will be developed in the column such that the central portion of the packing 16 is at a slightly lower temperature than the packing adjacent the wall of the column section 10. This thermal gradient will cause the gas molecules adjacent the column wall to move faster than those at the center, and will also cause a faster rate of desorption of adsorbed components from the packing adjacent the column wall, with the result that the component concentration profile will become distorted as the gases adjacent the column wall advance downwardly in the column faster than those in the center of the column. Thus, as the several component bands approach the lower end of the upper column section 10, the profiles have developed a concavity at the leading edge and a convexity at the trailing edge.

Due to the thermal conductivity characteristic of the solid packing material in the column section 12, this section can be used to counteract distortion resulting from undesirable thermal gradients in other parts of the column. Thus, the temperature throughout the solid particles in the column section 12 can be made relatively uniform so that one portion of the component concentration profile does not advance faster than another portion thereof. The high thermal conductivity characteristic of the packing material used in the column section 12 is employed conjunctively with a particle permeability gradient (which can be established in the packing material by the methods hereinbefore discussed) to reshape or counter-distort component profiles which have undergone undesirable distortion in passing through the conventional column packing material 16 in the upper column section 10. Thus, by providing a permeability gradient of the type illustrated in FIGURE 1 in which the radially outer portions of the particles 40 in the column section 12 are more densely packed and are finer particles than those toward the center thereof, the central portion of the gases moving through the column is permitted to advance relatively rapidly as compared to the gases located nearer the outer portion of the column section. The lagging central portion can thus be permitted to overtake the portion of the component band adjacent the column walls so that the leading and trailing edges of the profile are flattened or approach a planar configuration which is optimum in column operation.

It will be readily apparent that, instead of the type of permeability gradient depicted in FIGURE 1, any other desired type of permeability gradient can be established in the packing 40 of the section 12 and can be used to counteract the various types of profile distortion resulting from wall effect, undesirable channeling and the like. It will also be understood that heating elements of various types can be embedded in the particulate material 40 in the column section 12 to provide counteracting thermal gradients within the particulate material of high thermal conductivity. Thus, for example, to counteract the type of distortion resulting from wall effect, or from a thermal gradient of the type in which the peripheral portions of the packing 16 are at a higher temperature than the central portion thereof, a heating element can be placed in the center of the thermally conductive particles 40 in the section 12, and the environment of this section of the column maintained at a slightly lower temperature than the temperature to which the centrally located heating element is brought. A thermal gradient exactly opposite to that which would exist in the packing 16 in the upper section 10 will be thereby established in the column section 12, and the described profile distortion would be counteracted by the reverse effect occurring in the section 12.

Another aspect of the present invention is illustrated in FIGURE 2 of the drawings. Here an upper column section 44 includes a wall 46 having an annular, radially outwardly projecting flange 48 at the lower end thereof. The upper column section 44 is filled with a conventional particulate packing material 50. The lower column section 52 includes a wall 54 having an annular radially outwardly projecting flange 56 at the upper end thereof and enclosing conventional particulate packing material 58. Positioned between the upper column section 44 and the lower column section 52 is a gathering plate 60 having a centrally located aperture 62 therein which is of relatively small diameter as compared to the column diameter. The upper column section 44, lower column section 52 and gathering plate 60 are assembled as shown in FIGURE 2, using bolts 64 or other suitable fastening members extended through aligned holes in the flanges 48 and 56, and in the outer peripheral portion of the gathering plate 60. Suitable O-rings 66 are provided for establishing gas-tight seals between the several interconnected structural elements of the column.

The annular flange 48 is provided with a counterbore 70 in the lower end thereof so as to provide a downwardly facing seat 72. A screen pack or wire cloth assembly, designated generally by reference numeral 74, is seated in the counterbore 70, and includes a relatively fine mesh screen or wire cloth 76 abutting the seat 72 and extending diametrically across the column, and a coarse mesh screen or wire cloth 78 positioned directly below the fine mesh screen. An annular support ring 80 is placed in the counterbore 70 below the screen pack 74 and is secured in position within the counterbore by the use of screws 81 or other suitable means. The support ring 80 retains the screen pack in position with the fine mesh screen 76 abutting the seat 72. As an alternative construction, the coarse mesh screen or wire cloth, which is relatively rigid, can be welded in the counterbore 70, provided no need will subsequently arise to remove the screen pack 74 from the column, or to readjust its permeability for reasons hereinafter described.

The construction of the screen pack 74 is an important feature of the present invention. In the illustrated embodiment, the pores or openings through both the upper and lower screen 76 and 78, respectively, are of relatively uniform size rather than varying in size across the column cross-section. The lower screen or wire cloth member is preferably of relatively large mesh size and is relatively thick and has sufficient rigidity for supporting the column packing in the column section above the screen. The lower screen will have a mesh size which is dependent upon the column diameter, but which may range from about 2 to about 100 mesh. The upper screen or wire cloth 76 is of a very fine weave (in the range of from about 100 to about 250 mesh) and is preferably a dutch weave material in order to acquire increased rigidity which will prevent distortion of this member when the column is packed.

The described screen pack provides a number of advantages over packing supports of the type prevalently used heretofore in chromatographic columns. These types have primarily consisted of fritted steel plates, or of a metal plate with holes drilled therethrough and a support screen or batting provided on top of the perforated plate for preventing the loss of packing through the holes in the metal plate. Both of these structures have disadvantages which are obviated with the screen pack support of the present invention. Where fritted steel is utilized as a packing support, it does not lend itself to welding to the column walls without undergoing distortion of its porosity from that which characterizes the fritted steel prior to application of the heat required for welding. Moreover, it is expensive and is not always homogeneous in its porosity across the disc due to the nature of the manufacturing process by which it is made. Further, it does not withstand high pressures well. The metal plate having holes formed uniformly therethrough is also relatively expensive, since the attainment of a uniform permeability, or a preselected permeability gradient is a tedious and a time-consuming procedure. When the dual wire cloth assembly or screen pack 74 of the present invention is utilized as a packing support, it can be provided much more economically than either the fritted steel plate, or the perforated steel plate in conjunction with an overlying screen. Moreover, the lower screen 78, which is relatively thick and rigid, can be easily welded in the column where this type of construction is desired. No distortion of the desired screen permeability results from such welding. The strength of the screen pack of the invention is also considerably greater than that of the fritted steel plate. The superimposed screens have been found to create turbulent flow of gases moving therethrough, which turbulence reduces profile distortion of the type previously described, and tends to reshape the component profiles toward the optimum plug or planar flow. The screen pack can be used to support very fine packing in which the majority of the particles are very fine.

One of the most important advantages of the screen or wire cloth pack is the ability to precisely tailor the permeability across the dual screens to counteract virtually any type of profile distortion which may have occurred in the upstream section of the column, or to anticipate the occurrence of distortion in the column section below the screen pack. Thus, either of the screens, or both of them, may be initially constructed with larger pores existing in one portion of the screen, such as the radially outer portion, than exist in the center thereof. It is also possible to select the pore sizes of the two screens, and to orient the screens in their superposition one on the other so that a selected permeability gradient can be made to characterize the composite structure. Where the upper and lower screens 76 and 78 are both of uniform permeability so that no permeability gradient exists cross-sectionally of the column, the gathering plate 60 is provided as illustrated in FIGURE 2 and functions to bring the outer portions of the advancing component band into the center of the column and thus to overcome distortion due to wall effect or thermal gradient, in which distortion the leading edge of the component profile has acquired a concave configuration.

Another modification of the invention which employs a screen pack of the general type depicted in FIGURES 2 and 3, but which is more versatile in its uses than the fixed or stationary screen pack 74 there shown, is illustrated in FIGURES 4 and 5. An upper column section 86 filled with conventional packing 88 carries an annular, radially outwardly extending flange 90 which has a counterbore 92 of the type hereinbefore descrbied. Lower column section 94 is secured through a flange 96 to the flange 90 of the upper column section using bolts 98. The lower column section 94 is also filled with a conventional packing material 100.

A screen pack 102 utilized in the embodiment of the invention shown in FIGURE 4 includes a relatively fine mesh upper screen 104 which has a gradient in mesh size as depicted in FIGURE 5 of the drawings. The upper screen 104 is mounted in an upper supporting ring 106 which fits in the counterbore 92, and extends across and sealingly covers a circumferentially extending slot 108 formed through the flange 90. A pair of O-rings 110 are provided to provide a gas-tight seal between the upper supporting ring 106 and the face of the counterbore 92. The central portion of the outer periphery of the supporting ring 106 carries gear teeth 111 which are set inwardly in the supporting ring a sufficient distance that they do not contact the wall of the counterbore 92. A driving gear 112 is positioned in the slot 108 and is pivotally mounted on a pin 113 extended through the flanges 90 and 96. The driving gear 112 meshes with the gear teeth 111 on the upper supporting ring 106, and a part of it projects out of the slot 108.

A lower screen 114 of relatively coarse mesh is provided immediately beneath the upper screen 104 and is secured at its periphearl edge to a lower supporting ring 116. The upper supporting ring 106 is movable relative to the lower supporting ring 116 and both supporting rings are retained in position in the counterbore 92 by means of a retainer ring 118 which is maintained in position in the counterbore by suitable screws 120. The permeability of the lower screen 114 is relatively uniform throughout.

The screen pack 102 illustrated in FIGURES 4 and 5 can be used to provide a selected permeability gradient which can be selectively positioned in the column cross-section in order to counteract the development of a channeling tendency within the column. In referring to FIGURE 5, it will be noticed that the upper screen 104 has a very fine weave and low permeability in approximately one quadrant thereof, whereas the remaining portion of the screen is of relatively open weave and of larger mesh size. If channeling has developed in one portion of the column packing 88 in the upper column section 86, the driving gear 112 can be rotated to cause the upper supporting ring 106 carrying the upper screen 104 to be rotated about the axis of the column. This will in turn shift the restricted permeability portion of the upper screen circumferentially about the column axis, and in this way it can be brought into alignment with the portion of the packing 88 in which a channeling tendency has developed. When the restricted permeability portion of the upper screen 104 is aligned with the channeled portion of the packing 88, the effect will be to retard or slow down the fingering which tends to develop in cases of such channeling. In other words, a component band moving through the packing 88 will tend to develop a leading finger or protuberance at points in the packing where channeling has developed. By positioning the restricted permeability portion of the upper screen 104 in line with the advancing finger or protuberance of the component profile, its movement through the screen pack 102 can be retarded to permit the remaining portions of the profile to gain on, or catch up with, the finger so as to achieve the planar front flow which is optimum.

In FIGURE 6 of the drawings, a chromatographic column which incorporates the embodiments of the invention shown in FIGURES 1 and 2 is illustrated. A conduit 128 is provided for introducing a carrier gas and sample mixture to the upper end of the column. As the gaseous materials enter the column, they occupy a chamber 130 defined between a column closure plate 132 and a gathering plate 134. The gathering plate 134 is positioned at the upper end of a tubular column section 138 which is packed with a particulate material 140 of high thermal conductivity in the manner hereinbefore described. The high thermal conductivity particles 140 may be packed in the tubular column section 138 with a uniform density and permeability, or a preselected permeability gradient may be provided in the particles in the manner hereinbefore described. Whichever arrangement is employed, the positioning of the column section 138 packed with solid particles, such as metal turnings and the like, at the head of the column and immediately downstream from a sample vaporizing device (not shown) has certain marked advantages as hereinafter described. Greater flexibility of operation is provided by surrounding the column section 138 with a heat exchange device, such as the helically wound heating element 142.

After passing through the particles 140 of high thermal conductivity, the gases moving through the column pass through a screen pack 144 of the type hereinbefore described, and though such screen pack is illustrated as being of the type depicted in FIGURES 2 and 3 of the drawings, the screen pack shown in FIGURES 4 and 5 can also be utilized at this point if desired. The screen pack 144 can perform a profile reshaping function, or it may merely induce turbulence in the gases moving through the column so as to promote thermal and velocity equilibration in the gases moving downwardly in the column. In an intermediate column section 148, a conventional packing material 150 of the type hereinbefore described is utilized. At the lower end of the column section 148, another screen pack 154 is provided and supports the packing material 150, as well as functioning to permit any profile distortion which may have occurred in the column section 148 to be at least partially corrected by the employment of a preselected permeability gradient across the screen pack.

The depicted construction of the column, including an initial section packed with a highly thermally conductive particulate material, followed by a plurality of sections containing conventional packing with the screen packs of the present invention interposed between sections provides a highly versatile arrangement. A significant advantage is derived from the location at the head of the column of the section 138 which is filled with the thermally conductive particles 140. In this way, intimate heat exchange with the incoming sample is facilitated. The bed of thermally conductive particles 140 can be heated by the heating element 142 to a temperature considerably in excess of the downstream column temperature, or the particles can be brought to exactly the same temperature as the remainder of the column. Because of this versatility, either superheated vapors or vapors containing unvaporized liquid can be either heated or cooled as a particular analysis or set of conditions may require. Such conditions include sample composition, volume of sample and rate of delivery of sample to the column.

Another important function of the thermal conducting particles 140 located at the head of the column is to prevent the degradation of a liquid-carrying solid particulate packing material used in the first separatory section 148 of the column. In other words, when a separatory packing of the type comprising solid particles each coated with a stationary liquid is positioned at the head of the column, and is initially contacted by incoming sample and carrier gas, the impingement of the incoming gases on this material, and the fact that all of the sample components are present in a high concentration in the carrier gas at that particular location in the column, result in a stripping away or removal of the separatory stationary liquid from the supporting substrate particles, and the packing at this point is therefore soon degraded or rendered ineffective for separatory purposes. Where the thermally conducting particles 140 in the dry state are positioned at the head of the column, a considerably better distribution of carrier gas and sample is achieved before their initial contact with the column separatory packing 150, and there is less opportunity for a direct and concentrated impingement of all of the gases on certain specific column packing particles in a portion of the first bed of separatory material contacted.

The functions and usefulness of the screen packs 144 and 154 have already been described. They, of course, in any configuration and permeability pattern, impart turbulence to the gases passing therethrough and in this way promote thermal equilibration, as well as cross-mixing which overcomes velocity differentials at the fronts of the advancing component bands. By the provision of certain preselected permeability gradients across the screen packs, various types of component profile distortion can be reduced or eliminated. Finally, the screen packs provide a relatively inexpensive, yet sturdy and efficient support for the particulate packing material in the several column sections.

From the foregoing description of the invention, it will have become apparent that the present invention provides an improved chromatographic column which, in one embodiment, includes, as a subcombination of the column, a tubular section which is packed with a solid particulate material having a high thermal conductivity, and which can therefore be utilized both for effecting rapid and efficient heat exchange with an incoming sample, or, when positioned at a different location in the column, can be used to reduce the distortion of component profiles as they are developed in the column, and to permit various desirable longitudinal, as well as cross-sectional, thermal gradients to be established in the column at selected points along its length. The improved chromatographic column also includes, in one of its embodiments, the subcombination of a novel screen pack which can be more economically constructed than fritted steel discs and perforated plates which have previously been used as packing supports, yet which can be more easily positioned in the column by welding, which has substantial structural strength and which can be utilized, when properly constructed, for reducing component profile distortion occurring in the column as a result of wall effect, undesirable thermal gradients, channeling and other conditions of this type.

Although several preferred embodiments of the invention have been illustrated herein in order to point out succinctly the principles which underlie the invention, and some of the forms of structure which can be utilized for placing these principles in operation, it will be readily apparent that many modifications and innovations can be made in the structures herein illustrated without departure from such basic principles. Thus, various geometric patterns of dual screens having, in each case, various porosity and selected permeability gradients can characterize the screen packs used in the invention, and various beneficial combinations of such screen packs with column sections packed with thermally conducting particulate material can be contrived to effectively counteract substantially any type of distortion which may arise in the chromatographic column, as well as to provide for any type of heat exchange imparted to the incoming sample as it enters the column. All changes and modifications of this nature, provided only they do not depart from the basic principles upon which the invention is based, are deemed to be circumscribed by the spirit and scope of the invention except as the same may be necessarily limited by the appended claims or reasonable equivalents thereof.

What is claimed is:
1. A chromatographic column comprising:
   a tubular section;

a particulate packing material in said tubular section; and a packing supporting structure at one end of said tubular section, said packing supporting structure comprising:

a first screen extending across said tubular section and abutting said packing, said first screen having a mesh size such that the particulate packing material will not pass therethrough;

a second screen which is thicker and more rigid than said first screen positioned below and supporting said first screen, said second screen being of substantially larger mesh than said first screen;

said first screen being characterized by having a permeability gradient across it by virtue of its having a smaller mesh size in one portion thereof than in a different portion thereof;

means for mounting said first and second screens moveably with respect to each other;

means for moving one of said screens with respect to the other; and means for retaining said second screen in said tubular section and immediately below said first screen and on the opposite side thereof from the particulate packing material.

2. A chromatographic column as defined in claim 1 wherein said means for moving includes control means partially external of said tubular section connected to said first screen for rotating said first screen relative to said second screen to relocate the permeability gradient across the two screens.

3. Gas chromatography apparatus comprising:

a plurality of column sections serially interconnected to each other to provide for the continuous passage of gas therethrough;

thermally conductive solid particles confined in a bed in one of the terminal column sections of said serially interconnected sections;

means for varying the temperature of said thermally conductive solid particles;

a separatory packing material in the other column sections than that containing said thermally conductive solid particles;

a packing supporting structure extending transversely across one of said column sections in a direction normal to the direction of gas flow therethrough and comprising a plurality of superimposed screens having different mesh sizes;

means mounting at leats one of said plurality of screens moveably relative to another of said plurality; and means for moving said one of said plurality of screens relative to said another.

4. Gas chromatography apparatus as defined in claim 3 wherein said thermally conductive solid particles are packed to a different density in one portion of said bed than in another portion thereof to provide a permeability gradient across the bed.

References Cited

UNITED STATES PATENTS

| 3,225,520 | 12/1965 | Burow | 55—67 |
| 3,250,058 | 5/1966 | Baddour | 55—197 X |
| 3,310,932 | 3/1967 | Melpolder | 55—386 |
| 3,315,736 | 4/1967 | Carel | 55—197 X |

OTHER REFERENCES

Scott, R. P. W.: Gas Chromatography, 1960, Butterworths, London, pp. 240–41.

REUBEN FRIEDMAN, *Primary Examiner.*

J. L. DE CESARE, *Assistant Examiner.*